United States Patent [19]

Bae

[11] Patent Number: 5,355,323

[45] Date of Patent: Oct. 11, 1994

[54] HUMIDITY CONTROL METHOD FOR AN AIR CONDITIONER WHICH DEPENDS UPON WEATHER DETERMINATIONS

[75] Inventor: Young-Don Bae, Suwon, Rep. of Korea

[73] Assignee: Samsung Electronics Co., Ltd., Suwon, Rep. of Korea

[21] Appl. No.: 837,203

[22] Filed: Feb. 18, 1992

[30] Foreign Application Priority Data

Feb. 25, 1991 [KR] Rep. of Korea ............ 91-3020

[51] Int. Cl.$^5$ .................. G06F 15/20; F24F 3/14; G05B 13/02
[52] U.S. Cl. .................. 364/505; 364/551.01; 236/44 R; 236/44 C; 236/91 C; 62/176.6
[58] Field of Search .......... 364/505, 551.01, 550; 62/150, 176.6, 272; 236/44 R, 44 C, 91 C; 165/16

[56] References Cited

U.S. PATENT DOCUMENTS 4,567,939  2/1986  Dumbeck ................ 165/16
4,953,784  9/1990  Yasufuku et al. .......... 236/44 A

*Primary Examiner*—Jack B. Harvey
*Assistant Examiner*—Melanie Kemper
*Attorney, Agent, or Firm*—Burns, Doane, Swecker & Mathis

[57] ABSTRACT

An automatic control method for an air conditioner which can optimize the indoor temperature and humidity, wherein an adequate dehumidifying operation is performed by recognizing the humidity according to the weather based on the outdoor temperature changes preceived by the outdoor temperature sensor for a certain time period, which provides comfortable surroundings and increases the efficiency of the air conditioner as well by preventing apparatus freeze resulting from a prolonged dehumidifying operation under low temperatures.

13 Claims, 7 Drawing Sheets

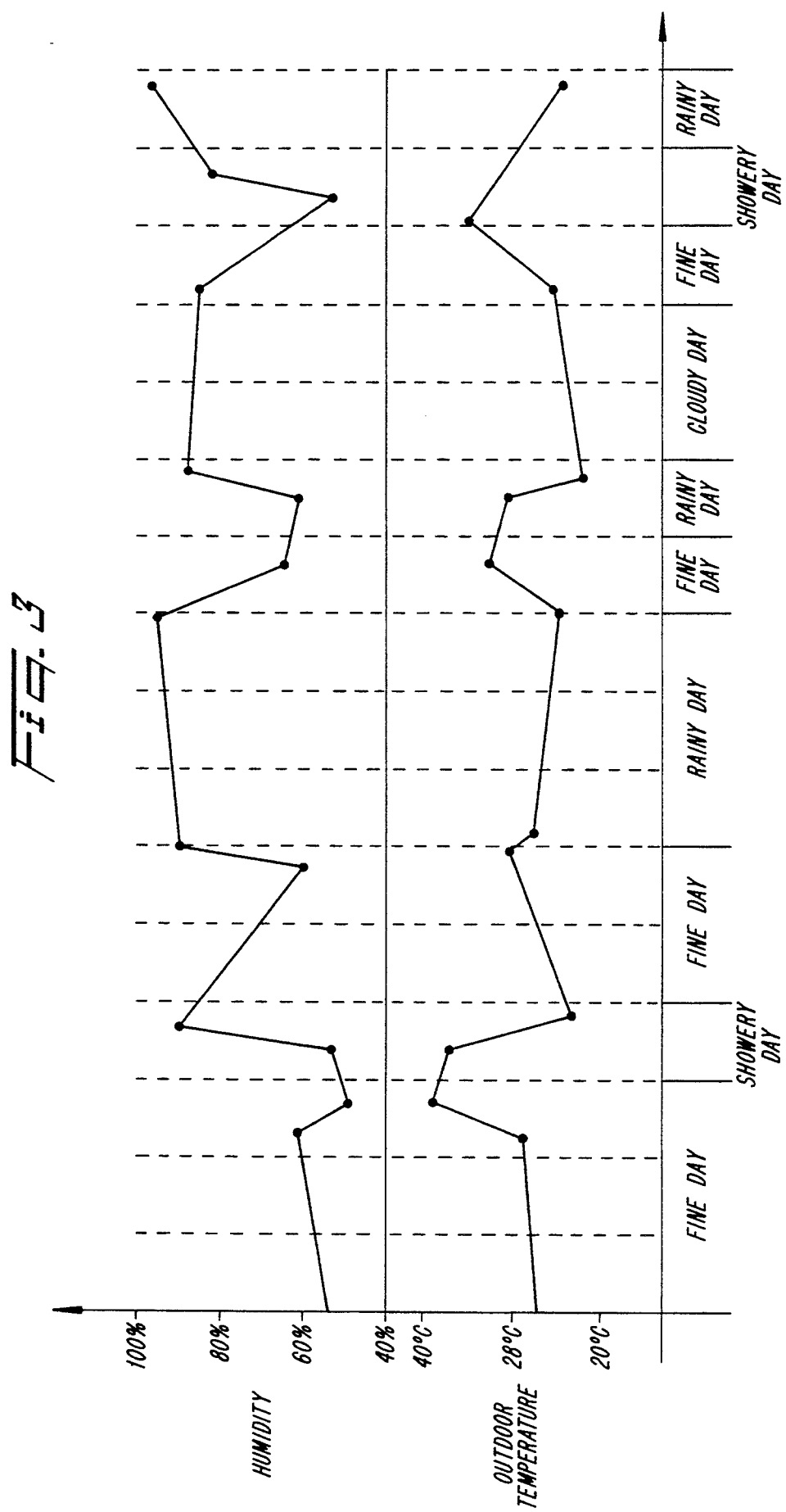

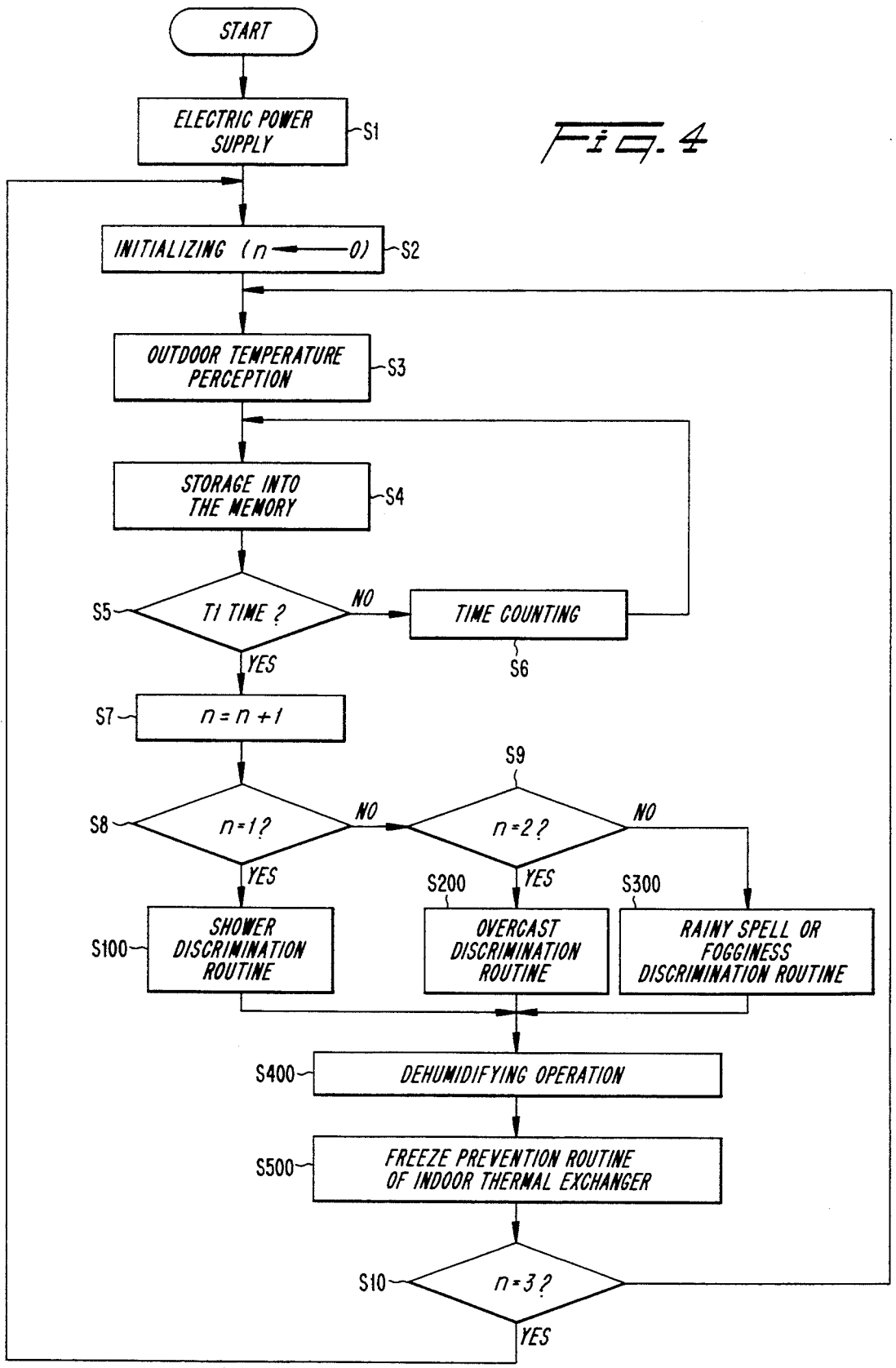

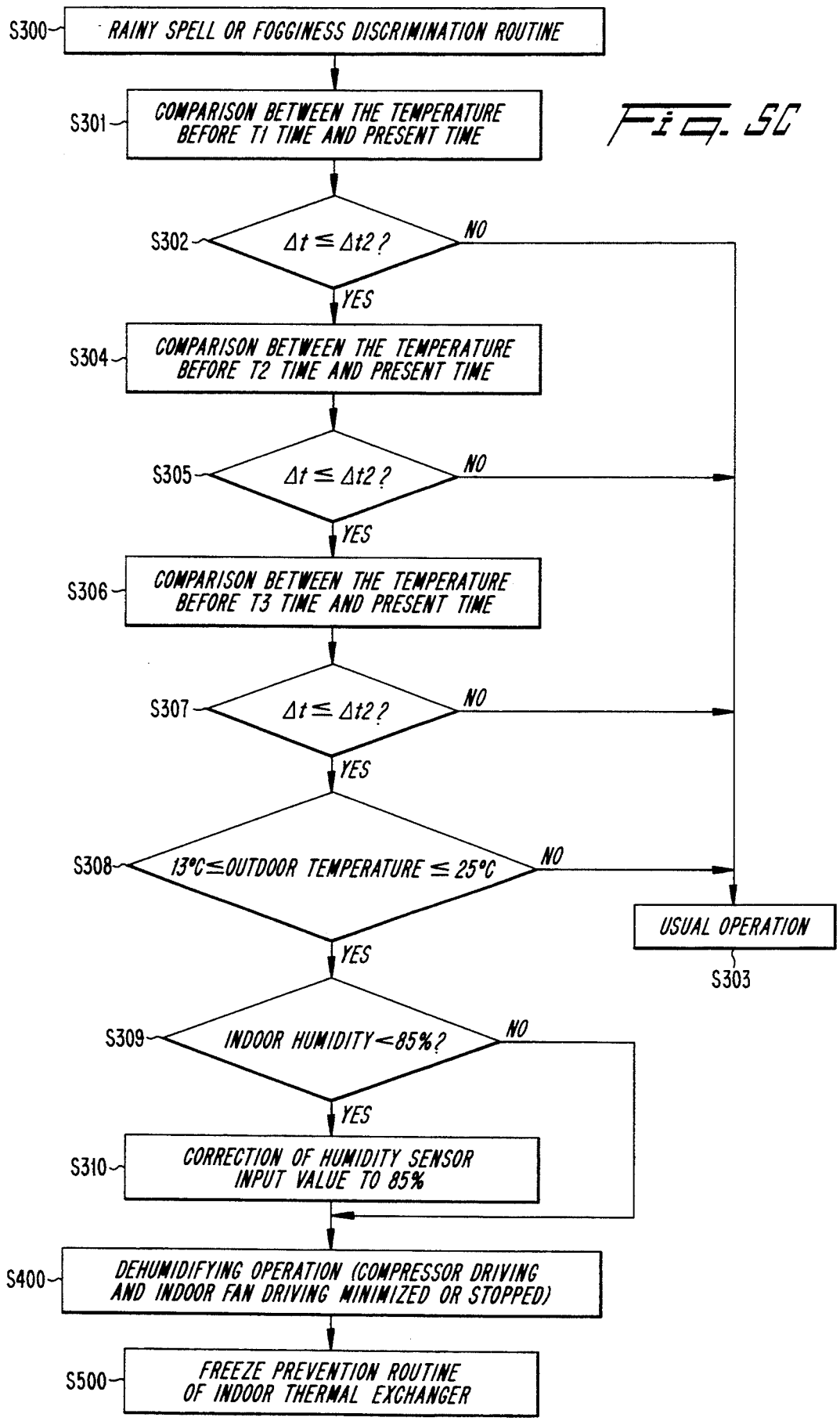

HUMIDITY CONTROL METHOD FOR AN AIR CONDITIONER WHICH DEPENDS UPON WEATHER DETERMINATIONS

FIELD OF THE INVENTION

The present invention relates to an automatic control method for an air conditioner, and more particularly to an automatic control method for an air conditioner which, after perceiving the outdoor temperature over a certain period of time, can read the weather conditions based on the variation width and temperature ranges of the perceived outdoor temperature as well as on the temperature preservation time. This automatic control method for an air conditioner can further optimize indoor temperature and humidity by controlling the air conditioner in accordance with the humidity given by the weather changes pre-stored in the microcomputer.

DESCRIPTION OF THE PRIOR ART

Generally, conditions are uncomfortable in high humidity while conditions are comfortable in low humidity. The same is applicable to the air conditioner wherein the operation rate for cooling of the air conditioner decreases in low temperature and high humidity conditions, and at the same time the high humidity remains unchanged and does not decrease further. Under these circumstances, the resident (or the user) has to reduce the indoor humidity by a manual dehumidifying operation or by an automatically switching cooling dehumidifying operation for comfort.

But in case of the manual dehumidifying operation, it is natural that the dehumidifying rate drops due to the humidity actually felt by the user. More particularly, the conventional humidity sensor of the air conditioner shows almost no changes in resistance value in a room humidity of over 80% while the variation of resistance values is too wide in an indoor humidity of under 30%.

Therefore, it is very difficult to detect the exact humidity variation widths between a room humidity of over 80% and that of under 30%, which is one of the drawbacks, deteriorating the dehumidifying efficiency in the performance of an automatically switching cooling-dehumidifying operation.

Of course, though the humidity of under 30% causes no big problem, the resident (or the user of the air conditioner) feels uncomfortable in a humidity of over 80% due to disagreeable indoor conditions. Further, the problem that foods get spoiled arises.

SUMMARY OF THE INVENTION

It is therefore an object of the present invention to provide solutions to the above-mentioned disadvantages wherein an auxiliary body including an outdoor temperature sensor installed separately from the main body, detects the outdoor temperature over a predetermined period, and the weather conditions are determined by the temperature preservation time, along with variation widths and temperature ranges of outdoor temperature detected by an outdoor temperature sensor attached to the auxiliary body.

If the humidity which was detected by the humidity sensor according to the weather conditions is deemed inaccurate, the humidity is corrected accordingly and the dehumidifying operation is performed according to the corrected humidity so that an effective dehumidifying operation, where the accurate detection by the humidity sensor is impossible over certain humidity ranges, can be achieved.

It is another object of the present invention to prevent the freezing of the indoor (room) thermal exchanger by delaying (or stopping the operation of) freeze release time and freezing danger release time when the outdoor temperature and dehumidifying operation keeping time do not conform to the given freeze prevention reference temperature, wherein the comparison between the outdoor and reference temperatures during the dehumidifying operation is made for freeze prevention of the indoor thermal exchanger.

BRIEF DESCRIPTION OF THE DRAWINGS

For better understanding of the nature and objects of the invention, reference is to be made to the following detailed description in connection with the accompanying drawings in which;

FIG. 3 depicts a graph showing an example according to the embodiment of the present invention;

FIG. 4 illustrates a flow chart depicting automatic control method of the air conditioner in accordance with the present invention;

FIG. 5A through FIG. 5D show the subroutine flow charts in accordance with FIG. 4.

DETAILED DESCRIPTION OF THE PREFERRED EMBODIMENTS

The automatic control method of an air conditioner according to the present invention comprises the steps of detecting and storing the outdoor temperature into memory over a predetermined time, performing recognition of weather conditions in accordance with storage frequency of outdoor temperature in the memory, performing a dehumidifying operation upon judgment of the humidity according to the recognized weather conditions, and performing a freeze prevention routine of an indoor thermal exchanger following the dehumidifying operation.

Figure 1:
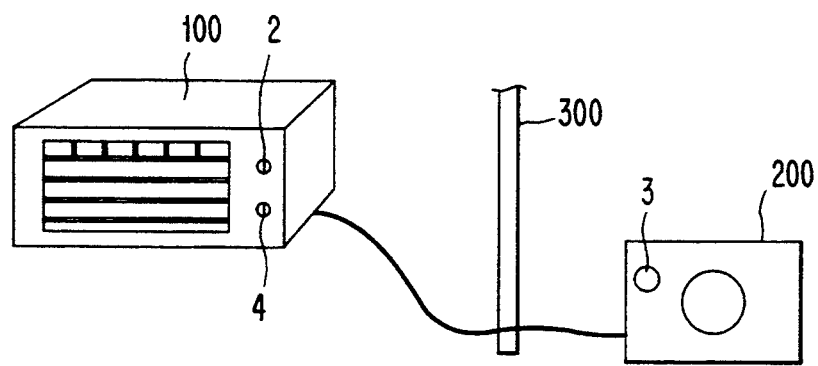
FIG. 1 is an overall construction diagram in accordance with the present invention.
Figure 2:
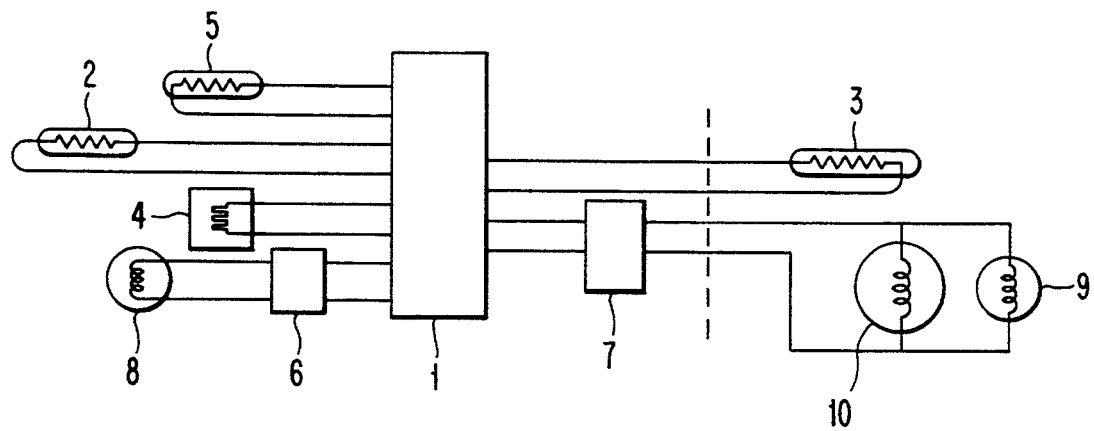
FIG. 2 shows a control system drawing according to the embodiment of the present invention.

Referring to FIG. 1 and FIG. 2, a microcomputer 1 is shown that controls general dehumidifying operations in accordance with the present invention. An indoor temperature sensor 2 detects the air temperature (i.e., indoor temperature) inducted into the indoor thermal exchanger (not shown) during a cooling operation and inputs the detected temperature into the microcomputer. An outdoor temperature sensor 3 is a main object of the present invention, which detects the outdoor temperature and inputs the outdoor temperature into the microcomputer 1 for the dehumidifying operation in accordance with the outdoor temperature. Humidity sensor 4 detects the indoor humidity for a certain period and inputs the indoor humidity into the microcomputer 1. An indoor driving part 6 drives the indoor motor 8 being controlled by the microcomputer 1. An outdoor driving part 7 controls the driving of the compressor 10 according to the necessity of increasing or decreasing the indoor temperature after being controlled by the microcomputer 1. Temperature sensor 5 detects the temperature of the indoor thermal exchanger.

Indoor temperature sensor 2 and humidity sensor 4, as illustrated in FIG. 1, are mounted on the upper and lower areas of the frontal right side of the main body of the air conditioner 100 which is installed in the center of the room against the wall 300.

The outdoor temperature sensor 3, mounted on the auxiliary body 200 of the air conditioner to be installed outside, detects the outdoor temperature.

The automatic control method of the separable air conditioner with reference to the accompanying FIGS. 1 and 2 will be described concisely below.

When the sensed values of the indoor temperature sensor 2, the indoor thermal exchanger, the temperature sensor 5 and the humidity sensor 4 are input into the microcomputer 1, and at the same time when the outdoor temperature (the open air temperature) value detected over a certain period of time by the outdoor temperature sensor 3 is input into the microcomputer 1, the humidity based on the outdoor temperature according to the reference data and the program pre-stored in microcomputer 1 is examined for correction. A pertinent dehumidifying operation is then performed and a program for freeze prevention of the indoor thermal exchanger is performed.

In other words, as shown in a graphed embodiment of FIG. 3 depicting the humidity and outdoor temperature according to the weather changes, the variation width Δt of the outdoor temperature during the rainy season or foggy conditions with humidity of over 85% is very narrow, the temperature preservation time Ti lasts long, and the outdoor temperature Tp ranging from 13° C. to 25° C. is low, and the variation width Δt of the outdoor temperature during a shower with humidity of over 90% is very wide, temperature preservation time Ti is short and the outdoor temperature Tp ranging from 30° C. to 45° C. is high. When the outdoor temperature Tp ranging from 20° C. to 29° C. is very high and when it is cloudy with a humidity of 75%, it is understood that the outdoor temperature variation width Δt, temperature preservation time Ti and the outdoor temperature remain in the middle between those of a rainy spell or foggy conditions and those of a shower whereby we can make a following table showing reference standard data.

TABLE 1

| weather | rainy spell or foggy conditions | cloud (overcast) | shower |
|---|---|---|---|
| outdoor temperature variation (Δt) | Δt < Δt2 | Δt < Δt1<br>Δt > Δt2 | Δt > Δt1 |
| perservation time | Ti > D | Ti > E | Ti > F |
| outdoor temperature (Tp) | 13° C.–25° C. | 20° C.–29° C. | 30° C.–45° C. |
| humidity (W) | humidity of over 85% | humidity of over 75% | humidity of over 90% |

*Note:
preservation time: D > E > F
outdoor temperature variation width: Δt1 > Δt2

Now, the above reference data is input into the storage device of the microcomputer 1, which is used as discrimination data for performing the dehumidifying operation.

Here, the humidity and outdoor temperature with reference to the weather described in FIG. 3 are based on those of Korea's summer season, therefore the reference standard data for this embodiment can be altered accordingly to accommodate the weather of any country applying the captioned method of the air conditioner according to the present invention.

In the meantime, when the humidity is over 80% wherein as the detected variation width of the humidity sensor 4 is almost nil, the weather is judged based on the discriminated indoor temperature, temperature variation width and preservation time, and then, the pertinent dehumidifying operation is performed upon the determination of humidity according to the weather.

Furthermore, various freeze prevention reference data is being used in the present invention for freeze prevention of the indoor thermal exchanger that may occur during a long duration dehumidifying operation under low temperatures, which means that the performing time of outdoor temperature and dehumidifying operations are fixed as per each step.

For instance, if a dehumidifying operation is continuously performed for almost 30 minutes (freezing time) under the outdoor temperature of 23° C. (freezing temperature), the freeze release time (about 6 minutes) is delayed, the operation is converted to a usual automatic operation and the temperature of the indoor thermal exchanger is prevented from further decreasing. If the dehumidifying operation is performed continuously under the outdoor temperature of below 25° C. (dangerous freezing temperature) for almost an hour (that is, the duration of dangerous freezing temperature), the freezing danger release time (about 3 minutes) is delayed and the dehumidifying operation is repeated. The above dehumidifying operation is performed only under the humidity of over X% (the humidity under which the user (or the resident) feels uncomfortable or the food gets spoiled is about 60%) and the operation is prevented from being performed under a humidity of below X%.

FIG. 4 is the flow chart showing the automatic control method of an air conditioner according to the objects of the present invention. FIG. 5A, FIG. 5B, FIG. 5C and FIG. 5D are subroutine flow charts of routines shown in FIG. 4, which will be explained in detail in connection with FIG. 2 and FIG. 3.

If the power is applied at step S1 to control the apparatus of FIG. 2, the indicator on the counter returns to 0 (n←0) at step S2 (initialization).

Thereafter, the outdoor temperature is detected by the outdoor temperature sensor 3 at step S3 and the detected outdoor temperature is stored into the memory of the microcomputer 1 at step S4. This kind of operation is repeated over certain period of time T1.

In particular, the duration of a certain time T1 is judged at step S5, and if the predetermined time period has not elapsed, the counting process keeps going on (step S6). If the duration of the certain time T1 elapses, the indicator on the counter is increased by 1(n=n+1) at step S7. At step S8, it is discriminated whether n has increased by 1.

Shower discrimination routine S100 is performed with the indicator on the counter pointing to 1 (n=1) and if shower discrimination routine S100 determines that the weather is showery, the humidity is corrected to correspond to the humidity of a shower. This will be described later in detail in the explanation of the shower discrimination routine. The dehumidifying operation is then performed (step S400), and freeze prevention routine S500 of the indoor thermal exchanger is performed.

Following the freeze prevention routine S500 of the indoor thermal exchanger, it is determined whether the count n is 3 or not (step S10). At this point, if the count n is not 3, that is, 1, control passes to outdoor temperature perception step S3, the outdoor temperature is perceived and then, the steps of storing in memory are performed repeatedly over a certain time period T1.

Meanwhile, if shower discrimination routine S100 determines during execution that it is not showery, the outdoor temperature perceiving step S3 is performed (not shown at FIG. 4).

In this way, time T2 (where T2=2T1) elapses if the process of storing the outdoor temperature is repeated twice, and the overcast discrimination routine S200 is performed. Likewise once the process of storing the outdoor temperature is repeated three times, time T3 (where T3=3T1) elapses. At this moment, rainy spell or fogginess discrimination routine S300 is performed.

And then, as in shower discrimination routine S100, if it proves to be overcast, a rainy spell or foggy conditions, the humidity is corrected to correspond to the humidity of a rainy spell or foggy conditions. And a dehumidifying operation is performed at step S400. Next, the freeze prevention routine at step S500 of the indoor thermal exchanger is performed. If it is not a rainy spell or foggy conditions, the outdoor temperature sensing at step S3 is performed.

In this system, the certain time T1 implies the time when the weather can be perceived, and the time when the weather can be perceived refers to a little longer period than the showering period. Certain time T2 implies a little shorter period than the perceivable-as-the-overcast period and the certain time T3 refers to a longer period than the perceivable-as-the-overcast period but a little shorter period than the perceivable-as-the-rainy-spell-or-fogginess period.

However please note that the above-mentioned periods are based on typical Korean weather. Accordingly the weather can be changed and be set up to accommodate the place where this invention is to be applied.

Figure 5A:
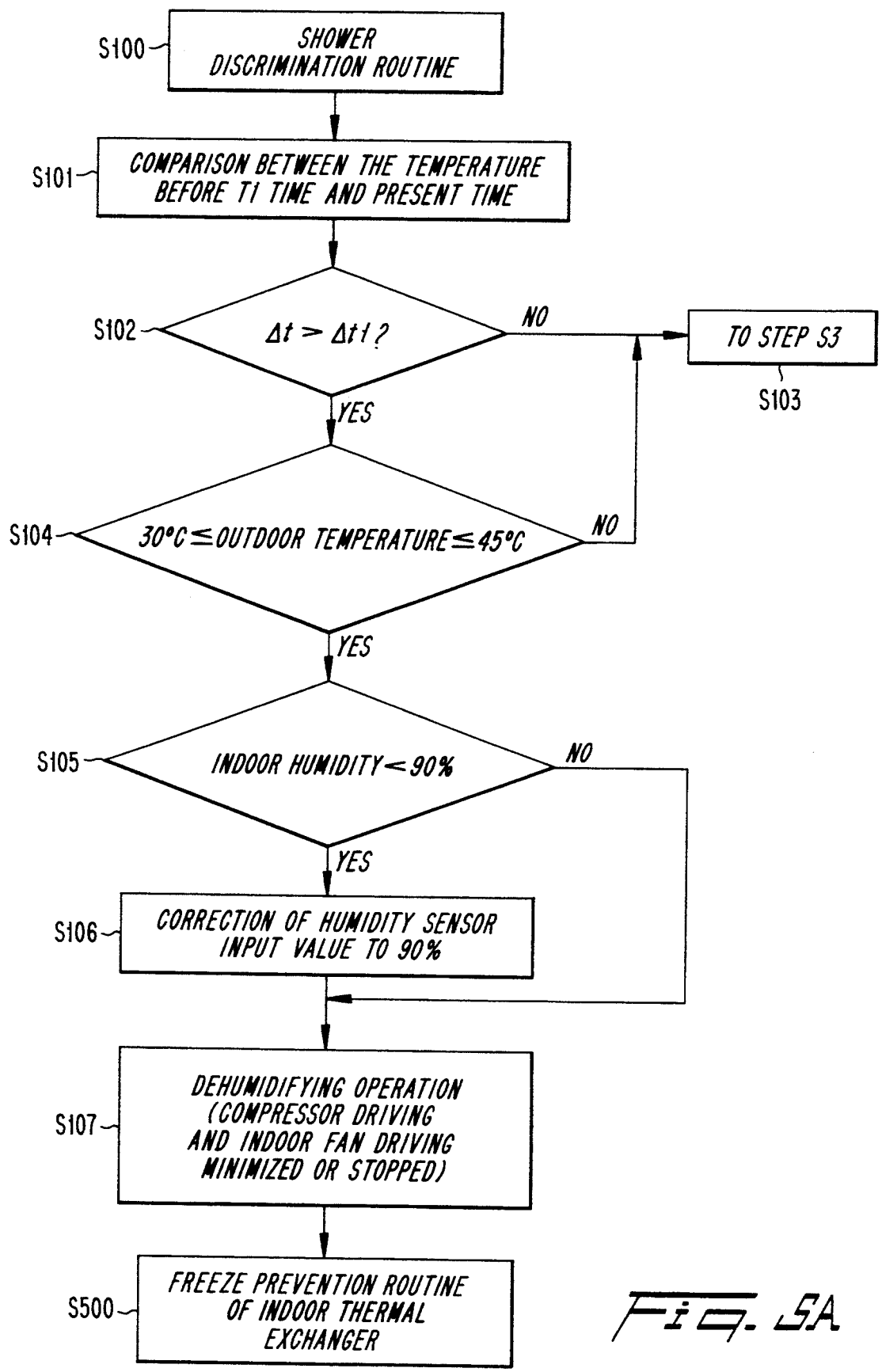

FIG. 5A shows the shower discrimination routine S100 of FIG. 4. Shower discrimination routine S100 can be performed after the initial certain time T1 elapses. This shower discrimination routine is possible as the outdoor temperature variation width $\Delta t$ in showering, as shown in table 1 and FIG. 3, is wide and temperature preservation time F is short.

Whether the weather is showery or not is perceived on the basis of this kind of characteristic. This will be explained in detail with reference to FIG. 5A.

First of all, once the initial certain time T1 elapses, the comparison is made between the temperature before the certain temperature T1 stored in the memory and the present temperature at step S101. Then, whether the outdoor temperature variation width $\Delta t$ is greater than $\Delta t1$ is discriminated at step S102.

If the discrimination result shows that the outdoor temperature variation width $\Delta t$ is below $\Delta t1$, which fails the time of showering test, (in other words, in the case of "No" at step S102), it moves, at step S103, to the temperature perceiving step S3 of FIG. 4 and perceives the outdoor temperature.

If the discrimination result shows that the outdoor temperature variation width $\Delta t$ is greater than $\Delta t1$, which satisfies the showering test (in other words, in the case of "Yes" at step 102) whether or not the outdoor temperature is within the range of 30° C.–45° C. is discriminated at step S104.

If the discrimination results show that the outdoor temperature is not within the range of 30° C.–45° C. (in the case of "No" at step S104), which implies the outdoor temperature variation width is satisfactory but the outdoor temperature ranges do not satisfy the shower test, then the procedure moves through step S103 to the temperature perceiving step S3 of FIG. 4 and perceives the outdoor temperature.

If the outdoor temperature satisfies the showering temperature range of 30° C.–45° C. (in the case of "Yes"), such that the temperature variation width and the outdoor temperature ranges satisfy the showering test, the procedure concludes that the weather is showery and discriminates whether the indoor humidity input from the humidify sensor 4 is 90% or not at step S105.

If the result finds the indoor humidity to be below 90% (in the case of "Yes" at step S105), the next step concludes that the humidity sensor 4 has not perceived the humidity correctly and corrects the input value of humidity sensor 4 to be 90% at step S106. Because the weather has been concluded to be showery, wherein the humidity at this moment should be over 90 as per table 1 and FIG. 3, the fact that the input value of humidity sensor 4 is below 90% implies that the humidity sensor 4 has not perceived the present humidity accurately.

Accordingly, the input value of humidity sensor 4 in the microcomputer 1 is adjusted to be 90 and the compressor 10 driving and indoor fan speed come down to minimum or the dehumidifying operation is performed to a halt (step S400).

In the meantime, if the indoor humidity discrimination result displays that the indoor humidity is over 90% (in the case of "No" at step S105) wherein it is judged that the humidity sensor 4 has correctly perceived the present humidity, then direct dehumidifying operation is performed without alteration of the input value for the humidity sensor (step S400). After the dehumidifying operation, the freeze prevention routine S500 of the indoor thermal exchanger is performed.

Figure 5B:
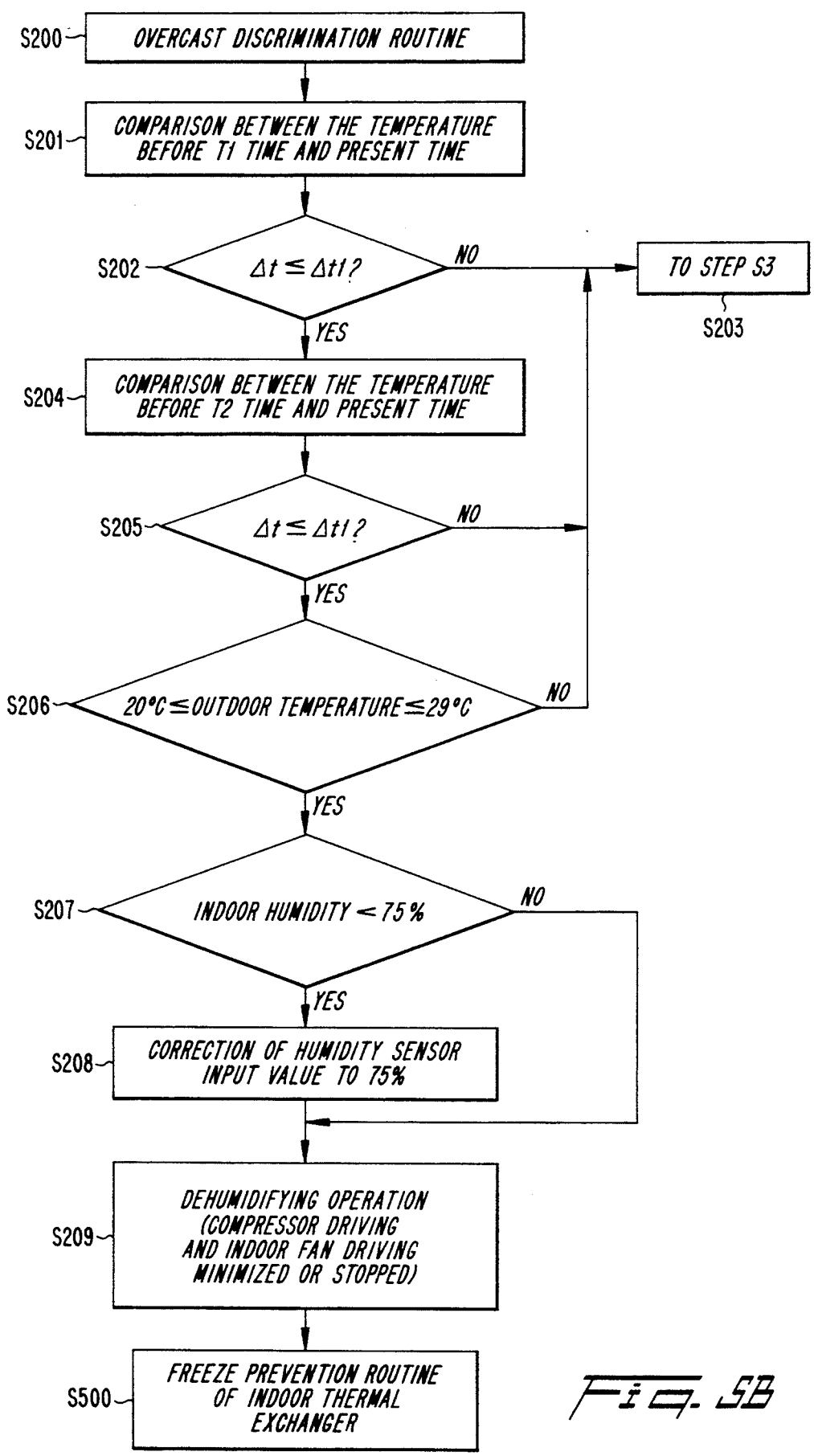

FIG. 5B explains the overcast discrimination routine S200 of FIG. 4. The overcast discrimination routine S200 can be performed after the certain time T1 elapses twice. This is because the outdoor temperature variation width $\Delta t$ during the overcast as shown in FIG. 3 and table 1 is narrower than that of the shower conditions and the preservation time E is long. The overcast weather condition is thus discriminated based on this characteristic.

This will be explained as follows in detail with reference to FIG. 5B.

First of all, once the certain time T1 elapses twice, the temperature before the certain time T1 stored in memory is compared with the current temperature at step S201 and the routine discriminates whether or not the outdoor temperature variation width $\Delta t$ is less than or equal to $\Delta t1$ at step S202.

If the discrimination result shows that the outdoor temperature variation width $\Delta t$ does not satisfy overcast conditions, (in the case of "No" at step S202) the next procedure is to go through step S203 to the temperature perceiving step S3 of FIG. 4 to determine the outdoor temperature. In the case where the outdoor temperature variation width Δt satisfies overcast conditions (in case of "Yes" at step S202), the temperature before the certain time (where T2=2T1) stored in memory is compared again with the present temperature at step S204 and whether or not the outdoor temperature variation width Δt is less than or equal to all is discriminated at step S205.

If above-mentioned result shows that the outdoor temperature variation width Δt does not satisfy overcast conditions (in the case of "No" at step S205), the next procedure is to move through step S203 to the temperature perceiving step S3 as shown in FIG. 4 to sense the outdoor temperature.

If the outdoor temperature variation width Δt satisfies overcast conditions (in the case of "Yes" at step S205), it is discriminated whether or not the outdoor temperature is within the overcast temperature range of 20° C.–29° C. at step S206.

If the discrimination result shows that the outdoor temperature is not within the range of 20° C.–29° C. (in the case of "No"), which therefore implies that the weather preservation time and the outdoor temperature variation width are satisfactory but the outdoor temperature ranges are not satisfactory, the next procedure is to go through step S203 to the temperature perceiving step S3 and perceive the outdoor temperature.

When the outdoor temperature is within the range of 20° C.–29° C. which satisfies the overcast temperature range (in the case of "Yes"), since the weather preservation time, temperature variation width and the outdoor temperature ranges satisfy the overcast condition, the weather is concluded to be overcast. Next, the indoor humidity input from the humidity sensor 4 is checked as to whether it is below 75% at step S207.

If the check result shows that the indoor humidity is below 75% (in the case of "Yes"), which is concluded to be an inaccurate perception by the humidity sensor 4, the next step is to alter the input value of the humidity sensor 4 to 75% at step S208, and the driving of the compressor 10 and the indoor fan speed is reduced to minimum or the dehumidifying operation is halted.

Meanwhile, if the indoor humidity discrimination result finds out that the indoor humidity is over 75% (in the case of "Yes"), it is considered that the humidity sensor 4 has accurately perceived the present humidity and without changing the input value of the humidity sensor, a direct dehumidifying operation is performed at step S400.

After the dehumidifying operation, the freeze prevention routine S500 of the indoor thermal exchanger is performed.

FIG. 5C illustrates the rainy spell or foggy conditions discrimination routine S300 of the above FIG. 4. The rainy spell or foggy conditions discrimination routine S300 can be performed after three elapses of the certain time T1. This is because the outdoor temperature variation width Δt during a rainy spell or foggy conditions as shown in FIG. 3 and table 1, is narrow and the outdoor temperature preservation time D is long. Based on this characteristic, it is discriminated whether the weather is a rainy spell or foggy.

This will be explained as follows in further detail with reference to FIG. 5C.

First of all, after the certain time T1 elapses three times, a comparison is made between the temperature before the certain time stored in memory and the present temperature at step S301, and the outdoor temperature variation width Δt is checked as to whether it is less than or equal to Δt2. When the discrimination result shows that the outdoor temperature variation width Δt does not satisfy the condition of a rainy spell or fogginess condition (in the case of "No"), the usual operation is performed at step S303. When the outdoor temperature variation width at does satisfy a rainy spell or foggy conditions (in the case of "Yes"), a repeated comparison is made between the temperature before the certain time T2=2T1 stored in memory and the present temperature at step S304, and the outdoor temperature variation width Δt is checked as to whether it is less than or equal to Δt2 at step S305.

If the above discrimination result shows that the outdoor temperature variation width Δt does not satisfy the condition of a rainy spell or foggy conditions (in the case of "No"), the usual operation is performed at step S303.

If the outdoor temperature variation width at satisfies the condition of a rainy spell or foggy conditions (in the case of "Yes"), a second comparison is made between the temperature before the certain time T3=3T1 stored in memory and the present temperature at step S306. And then the outdoor temperature variation width Δt is checked at step S307 as to whether it is less than or equal to Δt2.

When the discrimination result shows that the outdoor temperature variation width at does not satisfy the condition of a rainy spell or foggy conditions (in the case of "No"), the usual operation is performed at step S303. When the outdoor temperature variation width Δt satisfies the condition of a rainy spell or foggy conditions (in the case of "Yes"), the outdoor temperature is checked at step S308 as to whether it is within the range of 13° C.–25° C. which are the temperatures indicating a rainy spell or foggy conditions.

When the discrimination result discloses that the outdoor temperature is not within the range of 13° C.–25° C. (in the case of "No" at step S308), as the weather condition preservation time D and the outdoor temperature variation width are satisfactory but the outdoor temperature ranges are not satisfactory, the usual operation is performed at step S303. When the outdoor temperature range is within 13° C.–25° C., which is the range satisfying the conditions of a rainy spell or foggy conditions (in the case of "Yes" at step S308) and because the weather condition preservation time, temperature variation width and the outdoor temperature ranges do satisfy all the conditions of a rainy spell and fogginess, the weather is considered to be a rainy spell or foggy. Then the indoor humidity input from the humidity sensor 4 is checked as to whether it is below 85% at step S309.

When the above result shows that the indoor humidity is below 85% fin the case of "Yes"), it is considered that the humidity sensor 4 has not accurately perceived the indoor humidity. The next step is to alter the input value of the humidity sensor 4 to 85% at step S310, and the driving of the compressor and the indoor fan speed are minimized or their dehumidifying operations are halted at step S400.

Meanwhile, when the indoor humidity discrimination result shows that the indoor humidity is over 85% (in the case of "No"), it is concluded that the humidity sensor 4 has perceived the present humidity accurately, and a direct dehumidifying operation is performed at step S400 without correcting the input value of the humidity sensor. Following the dehumidifying operation, the freeze prevention routine S500 of the indoor thermal exchanger is performed.

Figure 5D:
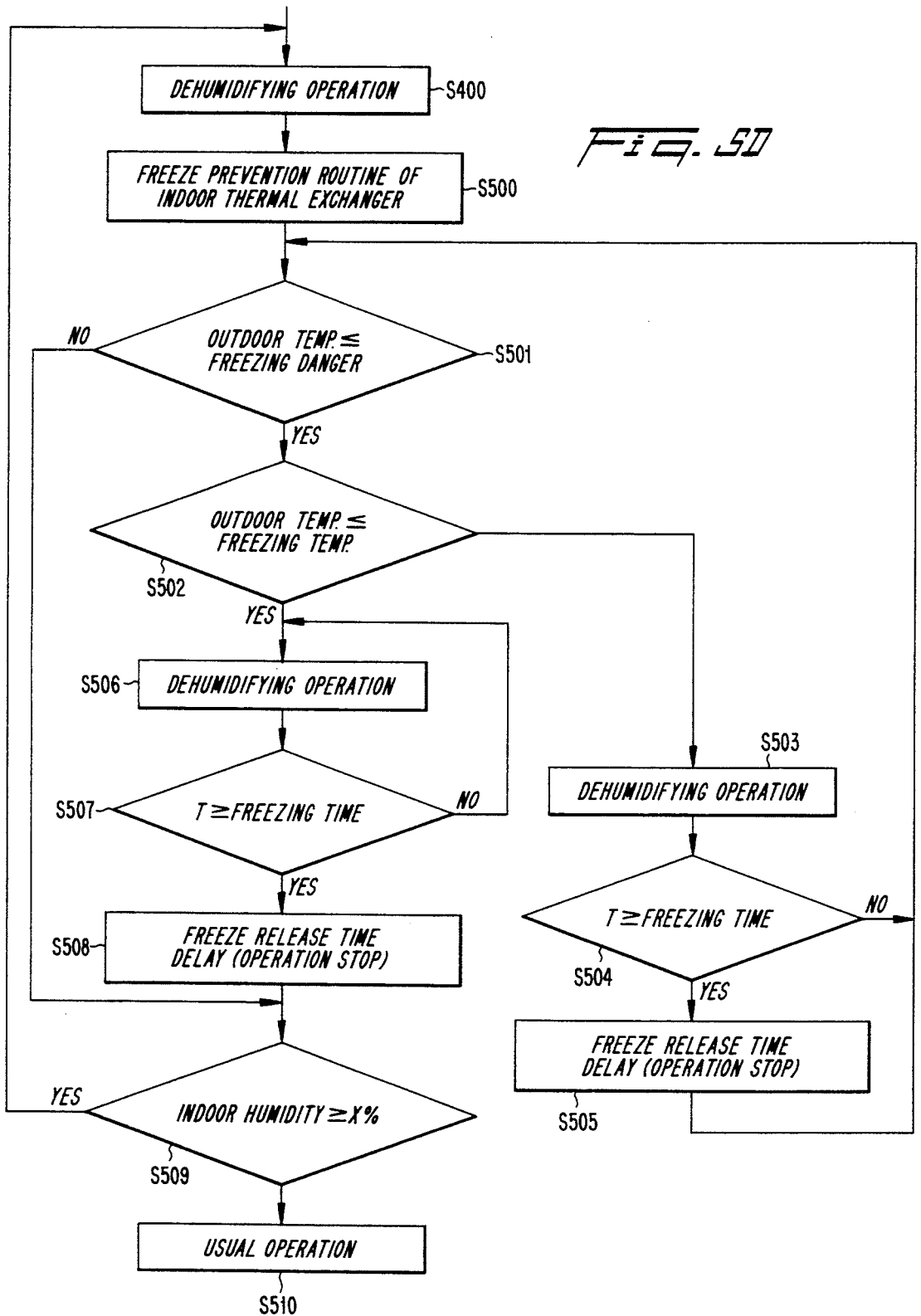

FIG. 5D is the freeze prevention routine S500 of the indoor thermal exchanger. This routine is for freeze prevention of the indoor thermal exchanger and also for the prevention of efficiency degradation in the air conditioner when the indoor thermal exchanger freezes under a low temperature condition (below about 23° C.) of the outdoor temperature along with continued dehumidifying operation beyond a certain duration of time.

For these purposes, first of all the outdoor temperature is checked at step S501 as to whether it is below the dangerous freeze temperature (about 25° C.). When the discrimination result shows that the outdoor temperature is above the dangerous freeze temperature (in the case of "No") it is recognized that there is no danger of freezing of the indoor thermal exchanger. And then the indoor humidity is checked as to whether it is over X% at step S509 (the humidity under which the user feels uncomfortable is around 60%).

When the discrimination result recognizes that the indoor humidity is over X% (in the case of "yes"), implying that a dehumidifying operation is to be carried out, the next procedure is to go to the dehumidifying operation S400 as per FIG. 4 and the dehumidifying operation is carried on continuously.

When the indoor humidity is below X% (in the case of "No") it is considered that a dehumidifying operation is not necessary, so the usual operation is carried on at step S510.

On the other hand, when the discrimination result of the outdoor temperature at step S501 finds out that the outdoor temperature is below the dangerous freeze temperature (in the case of "Yes"), a check is made to see if the outdoor temperature is below the freezing temperature (about 23° C.) at step S502.

When the outdoor temperature is below freezing temperature (in the case of "Yes" at step S502), which is a dehumidifying operation under a low temperature, the dehumidifying operation is performed at step S506. A check is made as to whether the freezing time (about 30 minutes) has elapsed at step S507, and when the dehumidifying operation under low temperature passes the freezing time, the indoor humidity discrimination operation is performed at step S509 during the freeze release time (about 6 minutes) after the operation halt, at step S508, to prevent the freeze.

Meanwhile, if the discrimination result shows that the temperature is below the dangerous freeze temperature but over the freezing temperature, increasing the possibility of the indoor thermal exchanger being frozen, the dehumidifying operation is performed at step S503. If the outdoor temperature is above the freezing temperature, a check is made to see if the long dangerous freeze time (about one hour) has elapsed at step S504.

After the dehumidifying operation is performed during the dangerous freeze time, operation is halted at step S505 during freezing danger release time (about 3 minutes) to prevent the freeze.

And then the discrimination operation of the outdoor temperature is performed at step S501.

When the outdoor temperature performing the dehumidifying operation at step S503 under a temperature range between under the freezing danger temperature and over the freezing temperature does not pass the freezing time, the discrimination operation of the outdoor temperature is performed at step S501.

According to the automatic control method for the air conditioner with reference to the present invention, the relative humidity is recognized based on the perceived outdoor temperature, wherein a relevant dehumidifying operation is performed accordingly, which renders comfortable surroundings, makes possible the prevention of apparatus freeze and results in the effect of reducing the economic losses as well.

The foregoing description of the preferred embodiment has been presented for the purpose of illustration and description. It is not intended to limit the scope of this invention. Many modifications and variations are possible in light of the above teaching. It should be noted that the present invention can be applied to all kinds of the apparatus within the scope of the above presentation, particularly without performing the perception of the outdoor temperatures over a certain period of interval, the temperatures can be watched continuously over a certain period of time, out of which a mean value can be derived and this mean value can substitute the outdoor temperatures.

It is intended that the scope of the present invention be defined by the claims.

What is claimed is:

1. An automatic humidity control method for an air conditioner depending upon a weather determination, comprising the steps of:

storing reference data according to weather characteristics for the weather determination in memory;

detecting an outdoor temperature over a certain first time period and storing it in memory for comparing with said reference data;

determining an outdoor temperature variation, an outdoor temperature range, and a temperature preservation time based upon the outdoor temperature detected over a certain first time period for comparing with said reference data for the weather determination and performing the weather determination which determines a plurality of recognizable weather conditions including showery conditions, overcast conditions, and rainy spell or foggy conditions based on a comparison with the reference data according to weather characteristics in response to the step of detecting;

recognizing an indoor humidity setting in accordance with using a shower discrimination routine for discriminating showery conditions, an overcast discrimination routine for discriminating overcast conditions, and a rainy spell or foggy conditions discrimination routine for discriminating a rainy spell or foggy conditions;

performing a dehumidifying operation responsive to the recognized indoor humidity; and subsequently performing a freeze prevention routine of an indoor thermal exchanger responsive to the indoor humidity setting to prevent freezing of the indoor thermal exchanger during the dehumidifying operation.

2. A method according to claim 1, wherein the plurality of recognizable weather conditions each having an associated duration time are stored and the certain first time period is a time period slightly longer than the duration time associated with the weather condition having the shortest associated duration time of the plurality of stored recognizable weather conditions.

3. A method according to claim 1, wherein the freeze prevention routine of the indoor thermal exchanger comprises the steps of:

determining whether the outdoor temperature is below a dangerous freezing temperature and/or a freezing temperature;

performing the dehumidifying operation during a dangerous freezing time when the outdoor temperature is determined to be below the dangerous freezing temperature and above the freezing temperature;

performing the dehumidifying operation during a freezing time when the outdoor temperature is determined to be below the dangerous freezing temperature and the freezing temperature;

stopping the dehumidifying operation when the dangerous freezing time or the freezing time has elapsed; and performing a usual operation when the outdoor temperature is above the dangerous freezing temperature and when the indoor humidity is not greater than a predetermined percentage.

4. A method according to claim 1, wherein the freeze prevention routine of the indoor thermal exchanger comprises the steps of:

when the outdoor temperature is below a dangerous freezing temperature and below a freezing temperature, performing a dehumidifying operation only for a predetermined first freezing time, and halting operations during a first freezing release time; and when the outdoor temperature is below a dangerous freezing temperature and above a freezing temperature, performing a dehumidifying operation, determining whether a predetermined second freezing time has lapsed, and halting operations during a second freezing release time.

5. A method according to claim 1, wherein weather characteristics are based on each of temperature variation width, temperature preservation time, and outdoor temperature ranges in response to rainy spell or foggy conditions, overcast, and showery conditions.

6. A method according to claim 1, wherein the shower discrimination routine comprises the steps of:

discriminating a temperature variation width and an outdoor temperature range after comparing the temperature before the certain first time period with a present temperature;

correcting a humidity input value if an indoor humidity measured by a humidity sensor does not satisfy a humidity range according to a determination made by discriminating the weather by virtue of temperature variation width, the outdoor temperature range, and temperature preservation time;

performing a dehumidifying operation according to the corrected humidity value if the indoor humidity measured by the humidity sensor does not satisfy the humidity range according to the weather determination and performing the dehumidifying operation according to the humidity measured by the humidity sensor if the humidity measured by the humidity sensor satisfies the humidity range according to the weather determination.

7. A method according to claim 6, wherein the temperature preservation time is discriminated by repeated comparison of the temperature before the certain first time period with the present temperature.

8. A method according to claim 1, wherein the overcast discrimination routine comprises the steps of:

comparing the temperature before the certain first time period with the present temperature;

discriminating the temperature variation width by comparing the temperature before a certain second time period with the present temperature after the above temperature comparison;

correcting a humidity input value if an indoor humidity measured by a humidity sensor does not satisfy the humidity range according to the weather determination made by discriminating the weather by virtue of temperature variation width, the outdoor temperature range, and temperature preservation time;

performing a dehumidifying operation according to the corrected input value if the indoor humidity measured by a humidity sensor does not satisfy the humidity range according to the weather determination, and performing the dehumidifying operation according to the humidity measured by the humidity sensor if the indoor humidity measured by the humidity sensor satisfies the humidity range.

9. A method according to claim 8, wherein the certain second time period is equal to two times the certain first time period.

10. A method according to claim 8, wherein the temperature preservation time is discriminated by repeated comparison of the temperature before the certain first time period with the present temperature.

11. A method according to claim 1, wherein the rainy spell or fogginess discrimination routine comprises the steps of:

comparing the temperature of a certain first time period and the temperature before a certain second time period with the current temperature;

discriminating the temperature variation width by comparing the temperature before a certain third time period with the present temperature following the above temperature comparison;

correcting the humidity input value if the indoor humidity measured by a humidity sensor does not satisfy the humidity range according to a determination made by discriminating the weather by virtue of temperature variation width, the outdoor temperature range, and temperature preservation time;

performing a dehumidifying operation according to the corrected humidity value if the indoor humidity measured by the humidity sensor does not satisfy the humidity range according to the weather determination, and performing the dehumidifying operation according to the humidity measured by the humidity sensor if the indoor humidity measured by the humidity sensor satisfies the humidity range.

12. A method according to claim 11, wherein the temperature preservation time is discriminated by repeated comparison of the temperature before the certain first time period with the present temperature.

13. A method according to claim 12, wherein the certain second time period is equal to two times the certain first time period and the certain third time period is equal to three times the certain first time period.

* * * * *